(12) United States Patent
Fonti

(10) Patent No.: US 7,604,446 B2
(45) Date of Patent: Oct. 20, 2009

(54) HOUSING MOUNTABLE WITH DRYWALL ANCHOR

(75) Inventor: Michael A Fonti, Deer Park, NY (US)

(73) Assignee: Honeywell International Inc., Morristown, NJ (US)

( * ) Notice: Subject to any disclaimer, the term of this patent is extended or adjusted under 35 U.S.C. 154(b) by 325 days.

(21) Appl. No.: 11/388,714

(22) Filed: Mar. 25, 2006

(65) Prior Publication Data
US 2007/0224012 A1    Sep. 27, 2007

(51) Int. Cl.
*F16B 35/06* (2006.01)
(52) U.S. Cl. .......................... 411/399; 248/906; 174/58; 411/999
(58) Field of Classification Search ................. 411/399, 411/999; 174/906; 248/58
See application file for complete search history.

(56) References Cited

U.S. PATENT DOCUMENTS

| | | | | |
|---|---|---|---|---|
| 1,062,635 | A * | 5/1913 | Clements | 411/521 |
| 2,470,927 | A * | 5/1949 | Hale, Jr. | 411/353 |
| 4,179,092 | A * | 12/1979 | Miyazawa | 248/309.1 |
| 4,601,625 | A | 7/1986 | Ernst et al. | |
| 4,860,513 | A * | 8/1989 | Whitman | 52/410 |
| 5,267,423 | A * | 12/1993 | Giannuzzi | 52/410 |
| 5,486,650 | A * | 1/1996 | Yetter | 174/53 |
| 5,626,245 | A * | 5/1997 | Kokenge et al. | 211/90.03 |
| 5,944,295 | A * | 8/1999 | McSherry | 248/304 |
| 6,382,892 | B1 * | 5/2002 | Hempfling | 411/30 |
| 6,455,773 | B2 * | 9/2002 | Bellanger | 174/50 |

* cited by examiner

*Primary Examiner*—Flemming Saether
(74) *Attorney, Agent, or Firm*—Barkume & Associates, P.C.

(57) ABSTRACT

A method of attaching a housing (such as a security system device housing) to a wall. A housing is provided with at least one mounting portion that has a mounting hole surrounded by a substantially thin lip. The housing is held by the installer in the exact desired position on the wall. The installer the inserts a wall anchor through the mounting portion and into the wall, typically with a screwdriver. The wall anchor has a cylindrical body with a flanged end and an insertion end, with the body having an exterior thread disposed thereon and the insertion end having a generally flat pointed extension of the body. The flanged end of the anchor has a recess suitable for insertion of the screwdriver. The installer inserts the anchor by pushing the extension through the mounting hole of the mounting portion and into the wall with the screwdriver engaged in the recess such that the extension is substantially within the wall. The installer then turns the wall anchor with the screwdriver tip inserted within the recess such that the exterior thread engages the drywall and draws the wall anchor into the wall until the flanged end overlaps the lip of the mounting portion and presses the lip against the surface of the wall. By making the lip tapered to mate with the taper of the flanged end of the anchor, the head of the anchor may be flush with the surface of the housing, although this is not required.

3 Claims, 5 Drawing Sheets

HOUSING MOUNTABLE WITH DRYWALL ANCHOR

TECHNICAL FIELD

This invention relates to mountable device housings, and in particular to device housings that are directly mounted to a surface such as a wall using a drywall anchor.

BACKGROUND ART

Devices such as security system device housings are usually mounted to a surface such as a wall or ceiling using drywall anchors. As known in the art, a drywall anchor such as those under the EZ-ANCHOR brand have two components—the anchor itself and a screw that is inserted into the anchor. An installer of a security system device (such as a PIR sensor, a siren, etc.) will mount the device housing by first installing the anchor into the drywall in a desired location and then inserting the screw almost completely into the internal cylinder of the anchor. Part of the screw head is left outside the anchor, and an aperture in the housing is placed over the screw head. The screw head may then be tightened to secure the housing against the wall.

This process takes an undesired amount of time and is subject to errors in location. First, the installer must approximate where the hole should be, mark it with a pencil, and then insert and turn the anchor into place. Many times the final location is not exactly in the desired location. In addition, when two or more anchors are used, the resulting alignment is often not straight and thus not aesthetically pleasing. Moreover, by requiring the use of an anchor and then a screw, multiple steps are required of the installer to mount the housing.

However, the design of the anchor and its snug interaction with drywall is desired to be used without the problems mentioned herein.

Thus, it is desired to provide a housing for security system devices and the like that is easily and quickly mountable on a wall or other surface without the problems of the prior art as described herein.

DISCLOSURE OF THE INVENTION

The present invention is a method of attaching a housing (such as a security system device housing) to a wall. A housing is provided with at least one mounting portion that has a mounting hole surrounded by a substantially thin lip. The housing is held by the installer in the exact desired position on the wall. The installer the inserts a wall anchor through the mounting portion and into the wall, typically with a screwdriver. The wall anchor has a cylindrical body with a flanged end and an insertion end, with the body having an exterior thread disposed thereon and the insertion end having a generally flat pointed extension of the body. The flanged end of the anchor has a recess suitable for insertion of the screwdriver. The installer inserts the anchor by pushing the extension through the mounting hole of the mounting portion and into the wall with the screwdriver engaged in the recess such that the extension is substantially within the wall. The installer then turns the wall anchor with the screwdriver tip inserted within the recess such that the exterior thread engages the drywall and draws the wall anchor into the wall until the flanged end overlaps the lip of the mounting portion and presses the lip against the surface of the wall. By making the lip tapered to mate with the taper of the flanged end of the anchor, the head of the anchor may be flush with the surface of the housing, although this is not required.

Although the housing may be mounted with only one mounting portion and anchor, the housing typically will have a plurality of mounting portions to provide a more secure mount. Preferably, the mounting hole is substantially circular in shape and the lip substantially surrounds the mounting hole. The lip may have an opening along a portion thereof, which is suitable for allowing insertion of the exterior thread through the mounting portion.

The present invention is also, in combination, a wall mountable housing kit that has a housing with at least one mounting portion comprising a mounting hole surrounded by a substantially thin lip, and a wall anchor that has a cylindrical body with a flanged end and an insertion end. The body has an exterior thread disposed thereon, the insertion end has a generally flat pointed extension of the body, and the flanged end has a recess suitable for insertion of a screwdriver. The wall anchor is suitable for being inserted through the mounting portion and into a wall and then turned with a screwdriver tip inserted within the recess such that the exterior thread draws the wall anchor into the wall until the flanged end overlaps the lip of the mounting portion and presses the lip against the surface of the wall.

Although the housing may be mounted with only one mounting portion and anchor, the housing typically will have a plurality of mounting portions to provide a more secure mount. Preferably, the mounting hole is substantially circular in shape and the lip substantially surrounds the mounting hole. The lip may have an opening along a portion thereof, which is suitable for allowing insertion of the exterior thread through the mounting portion.

BEST MODE FOR CARRYING OUT THE INVENTION

Figure 1:
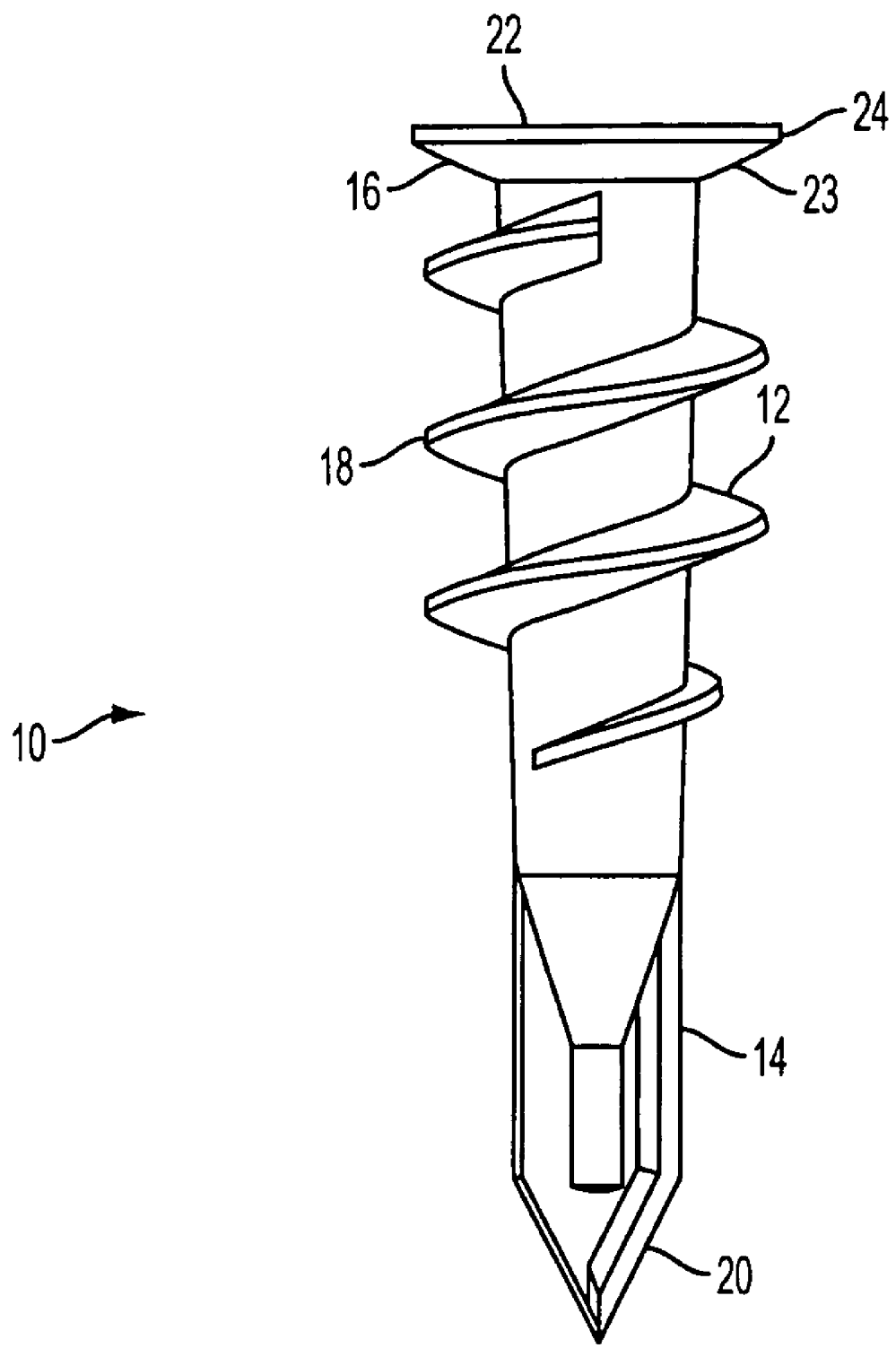
FIG. 1 is an illustration of the prior art anchor used in the present invention.

The present invention is now described in detail with respect to the Figures. FIG. 1 shows a typical wall anchor of the prior art that is used with this invention. Preferably, the housing will be designed to interface with a readily available wall anchor, such as the EZ-ANCHOR well known in the art. The prior art wall anchor 10 shown in FIG. 1 has a cylindrical body 12 with a flanged end 16 and an insertion end 14. The insertion end 14 has a generally flat pointed extension 20 that extends from the body 12, which is intended to pierce the drywall surface by striking with a hammer or with a screwdriver inserted into a recess 22 (or even by pressing with the hand). In any event, the extension 20 will be pushed through the drywall until the exterior thread 18 that wraps around the body 12 rests close to the surface of the drywall. In the prior art, the installer would then turn the screwdriver clockwise to have the thread 18 draw the anchor into the drywall in the same manner as a screw is tightened. When the tapered surface 23 of the flange 24 reaches the surface of the drywall, then the anchor is in place. Typically, the installer would turn the anchor until the flange 24 compresses the drywall surface so that the top of the flange 24 is countersunk and provides a smooth surface with the drywall.

As described, the threaded design of the wall anchor provides a sturdy and firm installation into the drywall, and the shape of the insertion end provides for easy installation. However, as explained above, the necessity for using a threaded screw, which in the prior art would then be screwed into the hollow portion of the body 12 as known in the art, provides several disadvantages in installation, especially when the installer is installing multiple devices ion a system. Therefore, the present invention uses the desirable design of the prior art wall anchor without requiring use of the screw as in the prior art.

Figure 2:
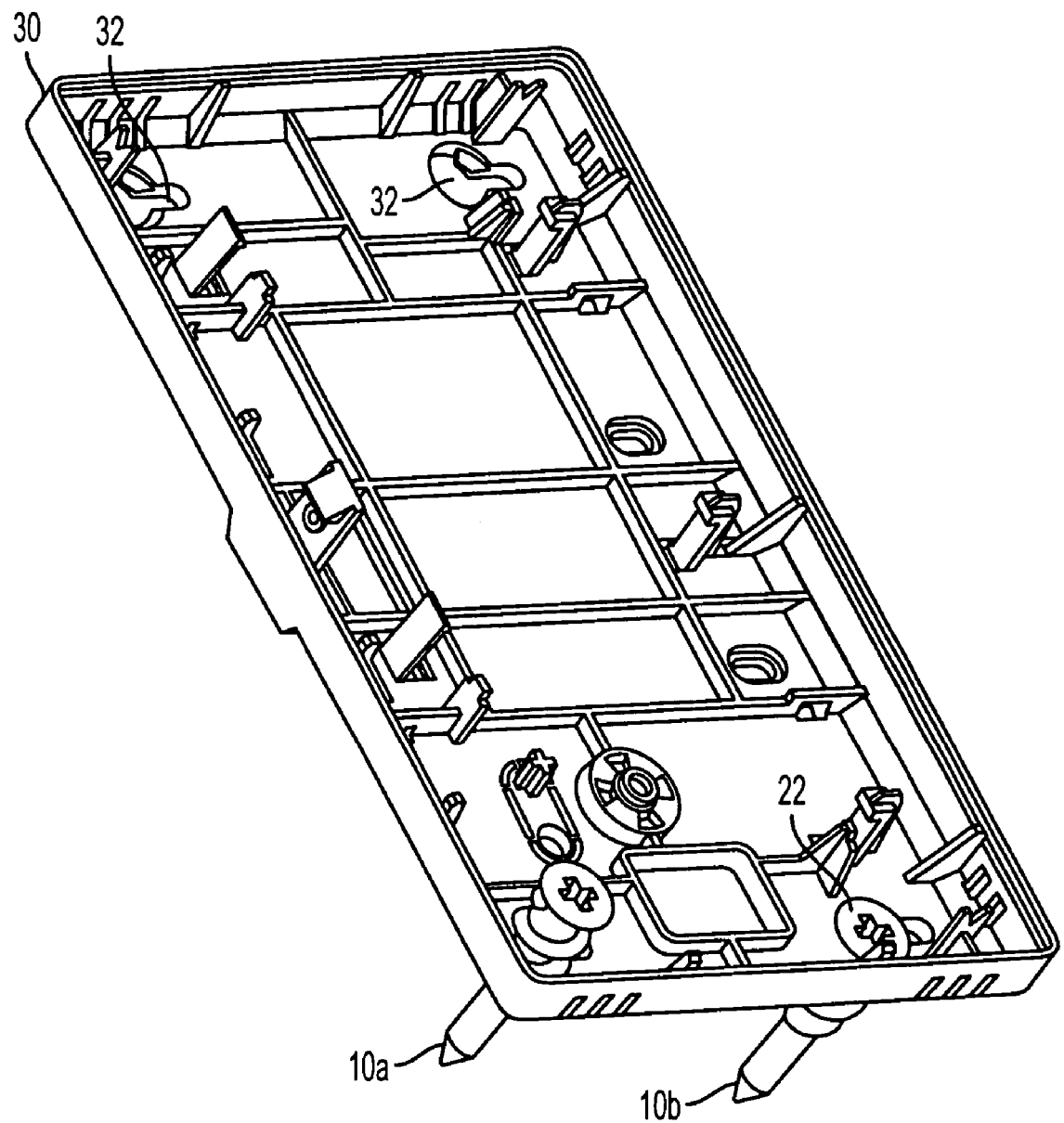
FIG. 2 is an illustration of the housing of the present invention.

Shown in FIG. 2 is a typical housing of the present invention with one anchor 10*a* partially inserted and a second anchor 10*b* fully inserted. The housing 30 would also include other components such as the device electronics (e.g. a sensor, circuit board, battery, etc.) and a cover, but these parts have been omitted for sake of clarity. The installer would typically install the housing 30 against the wall (or ceiling) surface and then attach the remaining parts to the mounted housing. The housing is typically fabricated from a plastic material that is somewhat resilient yet sturdy for its intended purpose.

Figure 3:
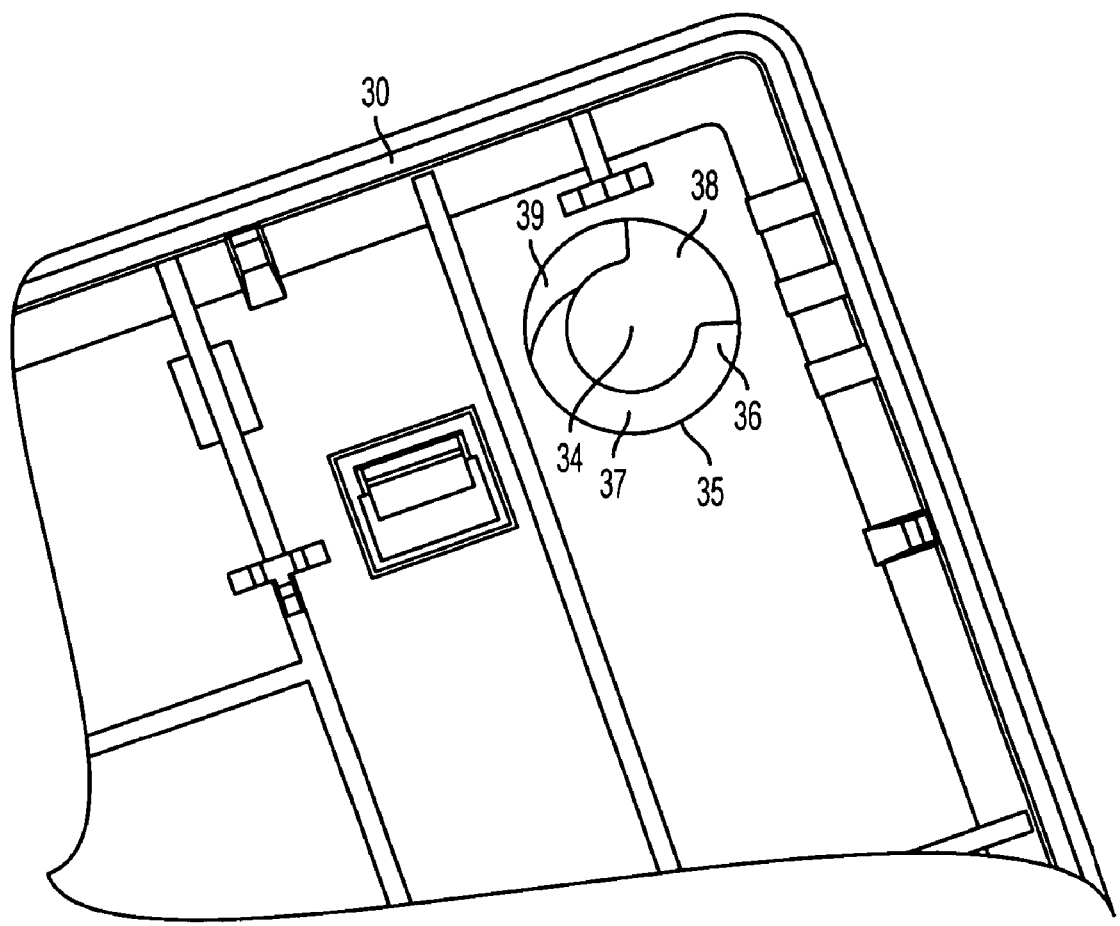
FIG. 3 is a close-up view of a mounting hole of the present invention.

The housing 30 comprises one or more mounting portions 32, for example with each mounting portion 32 located in a corner area of the housing 30 as shown in FIG. 2. As shown in FIG. 3, the mounting portion has a mounting hole 34 surrounded by a thin lip 36. The mounting hole 34 and the lip 36 are circular in shape as shown. The lip 36 will extend approximately three-quarters of the way around the perimeter of the mounting hole 34, forming an opening 38 as shown. The lip is preferably tapered from the outer edge 35 towards the inner edge 37 so as to substantially match the tapered surface 23 of the flange 24 and allow the flanged end 16 to countersink into the housing 30 when assembled as described below.

The opening 38 is provided to allow the thread 18 of the anchor 10 to be inserted and threaded therethrough. Without the opening 38, the diameter of the mounting hole 34 would have to be the same as the threaded portion of the anchor 10, in which case the flange 24 would not press against any surface of the housing 30 since it is the same diameter as the threaded portion as can be seen in FIG. 1. Thus, since it is desired to use the design of the prior art anchor 10, the opening 38 is provided to allow the mounting hole 34 to be smaller and allow the lip 36 to fit between the tapered surface 23 of the flange 24 and the drywall surface, providing a good stable attachment for the housing.

Thus, as described, the present invention allows an installer to use a prior art anchor along in order to easily install a device housing onto a drywall surface such as a wall or ceiling in a one-step manner, by simply inserting the screwdriver into the recess, pressing the anchor into the drywall at the exact desired location, and turning the anchor into the drywall to snug the housing against the wall in a firm and secure manner.

Although the preferred embodiment of the invention uses an anchor with a tapered surface that mates substantially with the taper of the lip 36, other size anchors may be used within the context of the invention. Thus, an installer may have anchors of varying sizes that can be used since the opening 38 will accommodate various sized threads. Likewise, the lip need not be tapered since there is no requirement that the anchor be countersunk into the housing 38 but need only press the housing firmly against the wall surface.

In addition, the lip may have a downward taper 39 which will follow the taper of the exterior thread 18 as it passes through the opening 38, making for a smoother installation.

Figure 4:
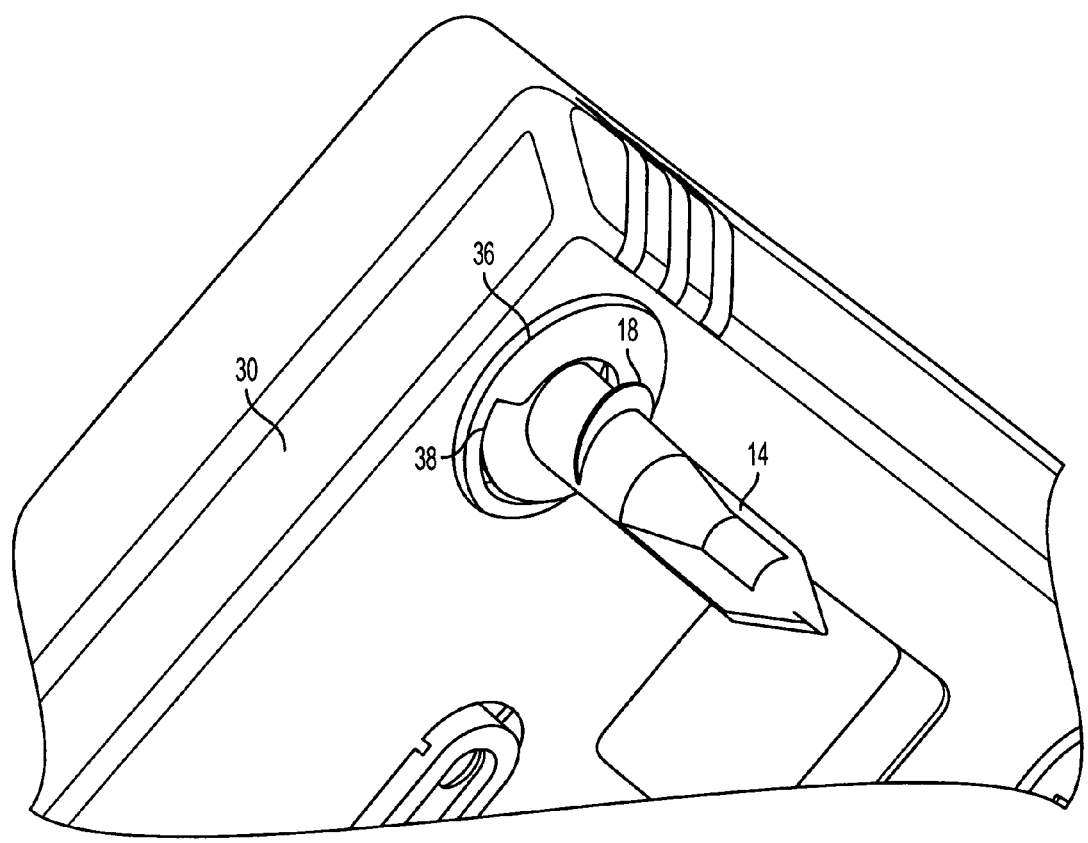
FIG. 4 is a perspective view of an anchor partially inserted into a mounting hole in the present invention.
Figure 5:
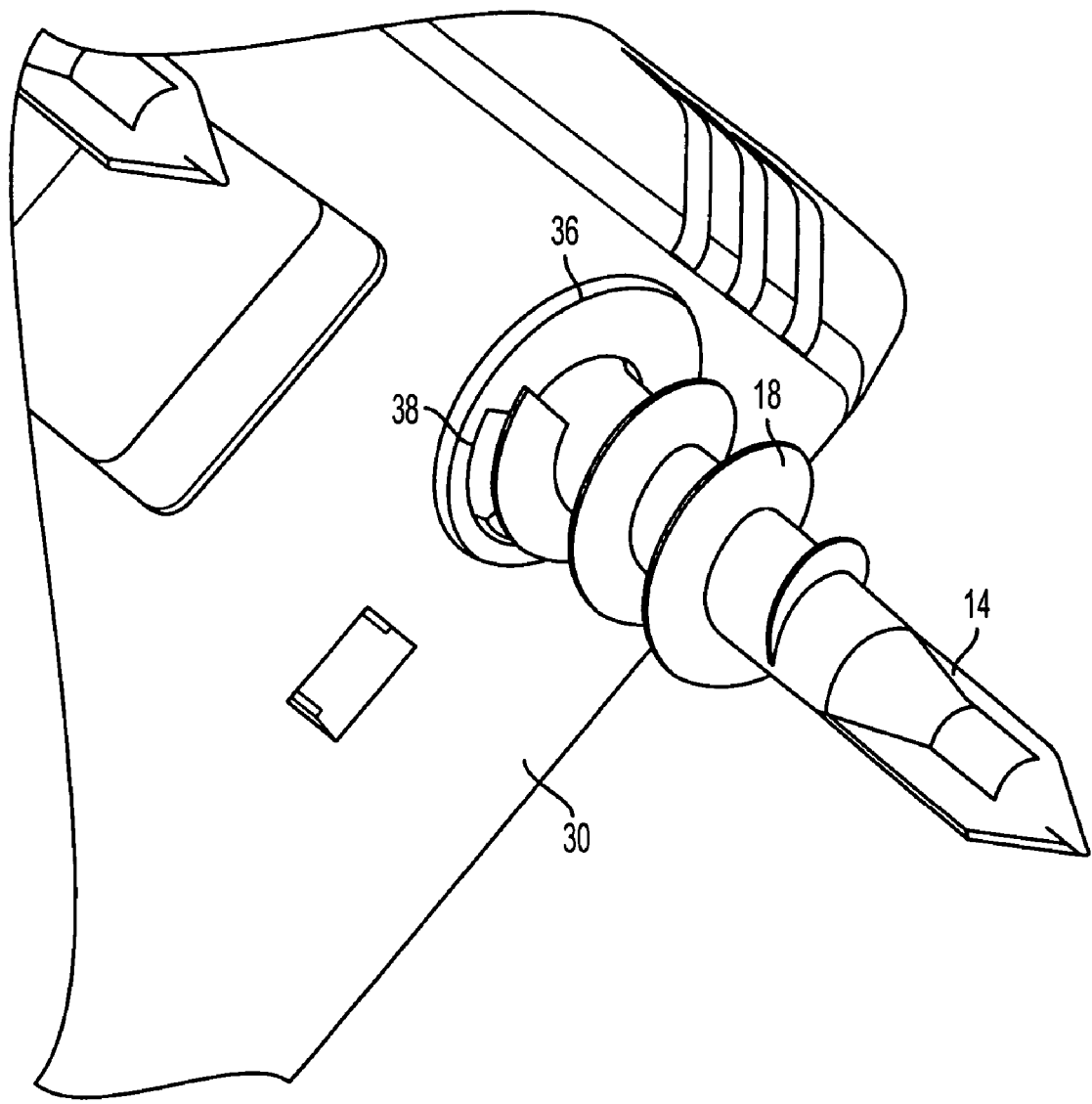
FIG. 5 is a perspective view of an anchor fully inserted into a mounting hole in the present invention.

FIGS. 4 and 5 illustrate a perspective view of an anchor partially inserted into a mounting hole in the present invention and a perspective view of an anchor fully inserted into a mounting hole in the present invention, respectively.

What is claimed is:

1. In combination, a wall mountable housing kit comprising:
  a. a housing with at least one mounting portion comprising a mounting hole surrounded by a substantially thin lip; and
  b. a wall anchor comprising a cylindrical body with a flanged end and an insertion end, the body having an exterior thread disposed thereon, the flanged end having a diameter approximately equal to the diameter of the exterior thread; the insertion end comprising a generally flat pointed extension of said body, the flanged end comprising a recess suitable for insertion of a screwdriver, wherein the wall anchor is suitable for being inserted through the mounting portion and into a wall and then turned with a screwdriver tip inserted within the recess such that the exterior thread draws the wall anchor into the wall until the flanged end substantially mates with the lip of the mounting portion and presses the lip against the surface of the wall;
  wherein the lip substantially surrounds the mounting hole and comprises an opening along a portion thereof, said opening suitable for allowing insertion of the exterior thread through the mounting portion;
  further wherein the lip of the mounting hole is tapered from an outer edge adjoining the housing towards an inner edge next to the mounting hole, the taper contouring substantially with a flange taper on the anchor so as to substantially match the tapered surface of the flange.

2. The housing kit of claim 1 wherein the housing comprises a plurality of mounting portions.

3. The housing kit of claim 1 wherein the mounting hole is substantially circular in shape.

* * * * *

UNITED STATES PATENT AND TRADEMARK OFFICE
CERTIFICATE OF CORRECTION

PATENT NO. : 7,604,446 B2
APPLICATION NO. : 11/388714
DATED : October 20, 2009
INVENTOR(S) : Michael A Fonti It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 534 days.

Signed and Sealed this

Fifth Day of October, 2010

David J. Kappos
*Director of the United States Patent and Trademark Office*